United States Patent [19]

McDonald

[11] Patent Number: 5,011,359

[45] Date of Patent: Apr. 30, 1991

[54] SILO ROTARY UNLOADER MONITOR

[76] Inventor: Edward McDonald, 270 S. Washington St., Lyndon Station, Wis. 53944

[21] Appl. No.: 503,950

[22] Filed: Apr. 4, 1990

[51] Int. Cl.[5] .......................................... B65G 65/38
[52] U.S. Cl. ................................. 414/289; 414/318; 414/320; 222/48; 198/502.1; 198/502.4
[58] Field of Search ............... 414/289, 301, 313, 318, 414/319, 320, 321, 322; 222/40, 48, 113; 406/114, 34, 35, 36; 198/502.1, 502.4

[56] References Cited

U.S. PATENT DOCUMENTS

| 2,963,327 | 12/1960 | Seymour et al. | 406/114 X |
| 3,217,907 | 11/1965 | Buschbom | 414/289 |
| 3,319,809 | 5/1967 | Prentice | 414/319 |
| 3,773,220 | 11/1973 | Morgan et al. | 222/48 |
| 3,912,090 | 10/1975 | Pondell | 414/319 |
| 4,047,434 | 9/1977 | Marsh et al. | |
| 4,134,486 | 1/1979 | Grone | 198/502.1 X |
| 4,161,120 | 7/1979 | Cloarec | |
| 4,227,836 | 10/1980 | Sizelove et al. | 414/313 X |
| 4,289,437 | 9/1981 | Hansen | 406/114 X |
| 4,487,310 | 12/1984 | Sansoucy | 198/502.1 X |
| 4,506,339 | 3/1985 | Kuhnlein | |
| 4,602,499 | 7/1986 | Norton et al. | 198/502.1 X |
| 4,667,156 | 5/1987 | Machino et al. | |
| 4,811,603 | 3/1989 | Bitetti | |

FOREIGN PATENT DOCUMENTS 302744 7/1968 Sweden ........................... 414/313

OTHER PUBLICATIONS

Heiser, "Applying Limit Switches for Automatic Control", from Automation magazine, Mar. 1966, pp. 89 & 90.

Primary Examiner—Robert J. Spar
Assistant Examiner—Robert S. Katz
Attorney, Agent, or Firm—Jerry T. Kearns

[57] ABSTRACT

A silo rotary unloader monitor provides an indication of a rotational speed of the rotary collector ring of a material unloading device suspended within the top portion of a vertical silo. A limit switch has an actuating sensor biased into engagement with a sinusoidal cylindrical surface formed on a wheel mounted for rotation with the rotary collector ring. An electric circuit connected to the limit switch causes a remotely mounted electric signalling lamp or buzzer to flash or sound at a rate proportional to the rotary speed of the collector ring.

2 Claims, 3 Drawing Sheets

SILO ROTARY UNLOADER MONITOR

BACKGROUND OF THE INVENTION

1. Field of the Invention

The present invention relates to rotary machine monitors, and more particularly pertains to a monitor for providing a remote indication of the rotational speed of a silo unloader rotary collector ring. A conventional type of silo unloader for unloading grain through a top opening in a vertical side wall has a discharge chute and a stationary collector ring suspended within the top portion of a silo by a cable harness. A rotary collector ring is rotationally mounted to the stationary collector ring and is attached to a frame member. A screw auger is mounted on the frame and a rotary drive causes rotation of the screw auger and rotation of the frame and rotary collector ring with respect to the stationary collector ring. The screw auger collects grain from the top of the silo and transmits the grain through the discharge chute exteriorly of the silo. The rotary collector ring is rotated by an electric motor drive through a belt system. Slipping of the drive belt can result in a substantial difference in the rotational speed of the rotary collector ring and the drive motor. Conventionally, an amp meter is utilized to provide a remote indication of the load on the drive motor to a ground level operation. The ground level operator controls a winch connected to the suspension harness for lowering the unloading apparatus within the silo, as the grain level therein decreases. During cold weather and wet conditions, the belt drive of the unloader slips with increasing regularity. Thus, the operator monitoring the amp meter observes a load reduction on the motor when the drive belt begins to slip. The operator then further lowers the apparatus within the silo, in the belief that the grain level has been reduced, thus reducing the load on the motor. In actuality, the unloader may already be submerged within the grain, thus preventing proper rotation of the device, due to the increased rotational resistance. In order to overcome this problem, the present invention provides a device which indicates the actual rotational speed of the rotary collector ring and provides a remote indication thereof to a ground level operator.

2. Description of the Prior Art

Various types of silo monitors are known in the prior art. A typical example of such a silo monitor is to be found in U.S. Pat. No. 4,047,434, which issued to N. Marsh et al on Sept. 13, 1977. This patent discloses a device for monitoring the depth of silage in a silo which includes a plurality of vertically spaced sensors. An electrical circuit includes a visual display for indicating the amount of material within the silo. U.S. Pat. No. 4,161,120, which issued to J. Cloarec on Jul. 17, 1979, discloses a wheel velocity sensor for indicating the rotational speed of a rotary element. A tooth rotor and a stator with a detecting head are mounted proximate the rotor teeth. The detecting head of the stator contacts the face of a resilient seal which is coated with a low friction material. U.S. Pat. No. 4,506,339, which issued to K. Kuhnlein on Mar. 19, 1985, discloses a device for measuring and monitoring the angular velocity of the shaft of a rotating machine. A plurality of sensors are positioned adjacent the shaft of the rotating machine for generating sequential pulses with periods proportional to the angular velocity of the shaft. U.S. Pat. No. 4,667,156, which issued to T. Machino et al on May 19, 1987, discloses a tooth sensing wheel of the type utilized in anti-lock breaking systems. U.S. Pat. No. 4,811,603, which issued to R. Bitetti on Mar. 14, 1989, discloses a tachometric generator including an input shaft connected to a drive take-off frame a vehicle, a main shaft connected to the input shaft by a resilient coupling to an output shaft to an external mechanical transmission. The speed of rotation of these shafts is detected by a magneto-electric sensor.

While the above mentioned devices are directed to rotary machine monitors, none of these devices discloses a monitor for providing a remote indication of the actual rotational speed of the rotary collector ring of a friction driven rotary silo unloader. Inasmuch as the art is relatively crowded with respect to these various types of rotary machine monitors, it can be appreciated that there is a continuing need for and interest in improvements to such rotary machine monitors, and in this respect, the present invention addresses this need and interest.

SUMMARY OF THE INVENTION

In view of the foregoing disadvantages inherent in the known types of rotary machine monitors now present in the prior art, the present invention provides an improved silo rotary unloader monitor. As such, the general purpose of the present invention, which will be described subsequently in greater detail, is to provide a new and improved silo rotary unloader monitor which has all the advantages of the prior art rotary machine monitors and none of the disadvantages.

To attain this, a representative embodiment of the concepts of the present invention is illustrated in the drawings and makes use of a silo rotary unloader monitor which provides an indication of a rotational speed of the rotary collector ring of a grain unloading device suspended within the top portion of a vertical silo. A limit switch has an actuating sensor biased into engagement with a sinusoidal cylindrical surface formed on a wheel mounted for rotation with the rotary collector ring. An electric circuit connected to the limit switch causes a remotely mounted electric lamp to flash at a rate proportional to the rotary speed of the collector ring.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved silo rotary unloader monitor which has all the advantages of the prior art rotary machine monitors and none of the disadvantages.

It is another object of the present invention to provide a new and improved silo rotary unloader monitor which may be easily and efficiently manufactured and marketed.

It is a further object of the present invention to provide a new and improved silo rotary unloader monitor which is of a durable and reliable construction.

An even further object of the present invention is to provide a new and improved silo rotary unloader monitor which is susceptible of a low cost of manufacture with regard to both materials and labor, and which accordingly is then susceptible of low prices of sale to the consuming public, thereby making such rotary machine monitors economically available to the buying public.

Still yet another object of the present invention is to provide a new and improved silo rotary unloader monitor which provides in the apparatuses and methods of the prior art some of the advantages thereof, while simultaneously overcoming some of the disadvantages normally associated therewith.

Still another object of the present invention is to provide a new and improved silo rotary unloader monitor for providing a ground level indication of the actual rotary speed of a silo rotary unloader disposed within the top portion of a vertical silo.

Yet another object of the present invention is to provide a new and improved silo rotary unloader monitor for indicating the actual rotational speed of a rotary collector ring of a silo unloader which is driven through a limit slip belt drive.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
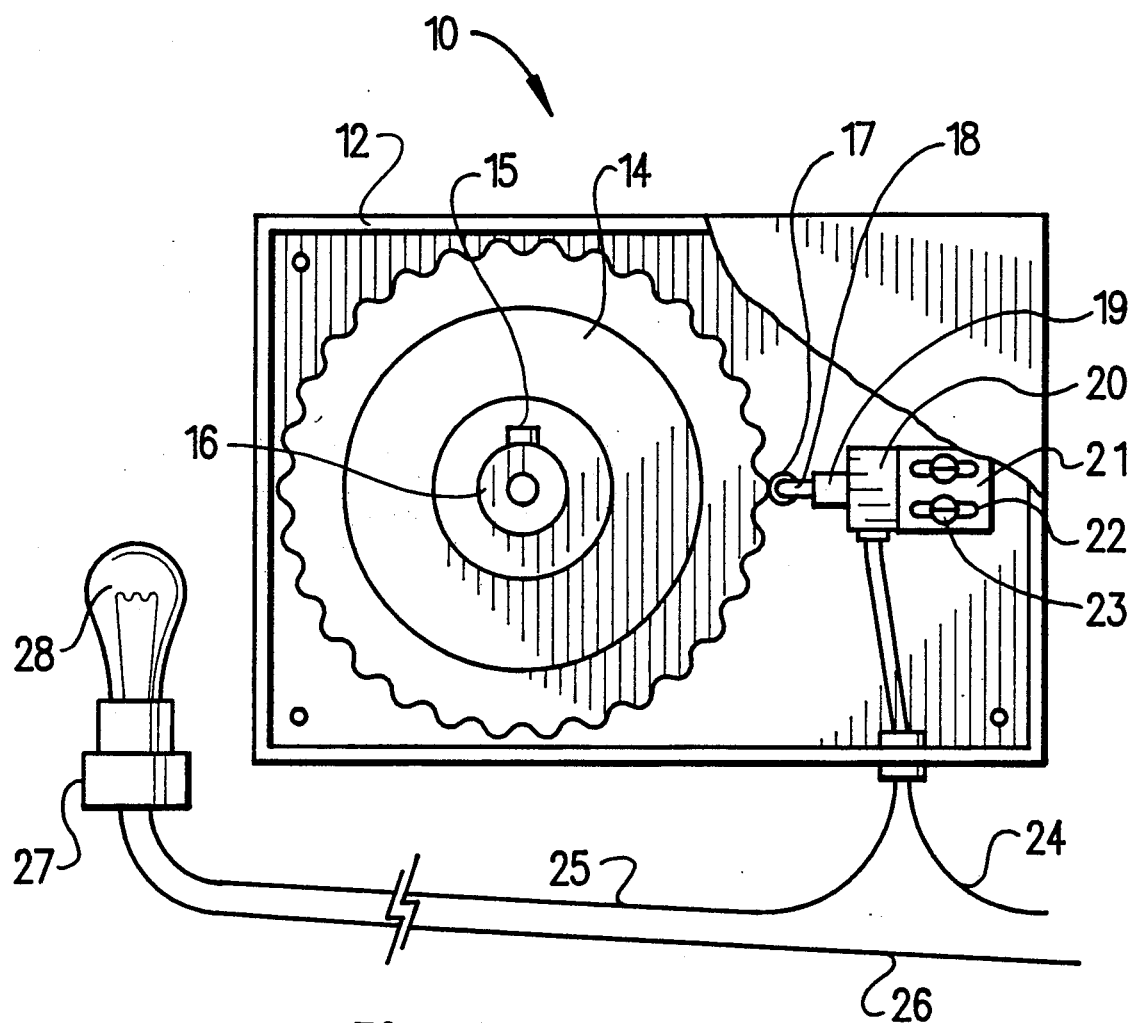
FIG. 1 is a top view, partially cut away, illustrating the components of the silo rotary unloader monitor according to the present invention.

With reference now to the drawings, and in particular to FIG. 1 thereof, a new and improved silo rotary unloader monitor embodying the principles and concepts of the present invention and generally designated by the reference numeral 10 will be described.

More specifically, it will be noted that the first embodiment 10 of the invention includes a housing 12 adapted for securement on a stationary collector ring portion of a conventional silo rotary unloading device. A shaft 16 is connected for rotation with a rotary collector ring portion of the silo unloader. A wheel 14 is secured by a key 15 for rotation with the shaft 16. The sensor wheel portion 17 of a limit switch 20 is secured to an axially movable plunger 18 mounted for reciprocation within a sleeve 19. The limit switch includes a bracket portion 21 having elongated slots 22 through which conventional screws 23 are secured. This construction allows adjustable positioning of the limit switch with respect to the wheel 14. The limit switch 20 is connected in electrical leads 24 and 25 which form one side of an electric circuit. A suitable current source, such as an electric battery or a transformer power source is provided. The output lead 25 from the limit switch 20 is connected to an electric socket 27. The opposite side of the circuit is formed by an additional electric wire or lead 26. A conventional electric lamp 28 is secured within the socket 27.

Figure 2:
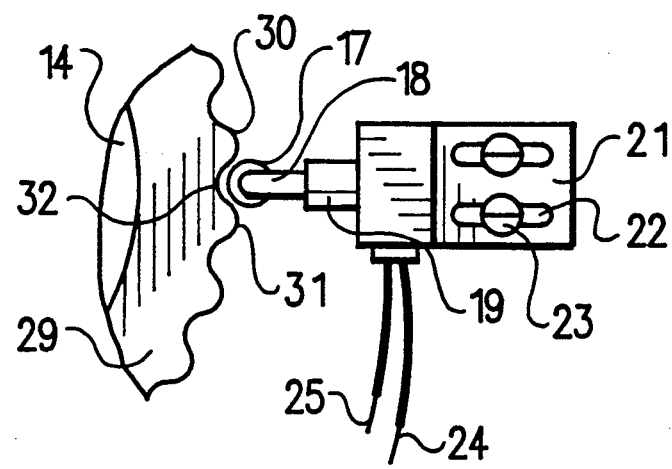
FIG. 2 is an enlarged detail view, illustrating the manner of operation of the rotary monitor of the present invention.

FIG. 2 is a detail view which illustrates the sinusoidal wave pattern formed on the cylindrical side wall surface of the wheel 14. The sinusoidal pattern is formed by a plurality of crests, for example 30 and 31, separated by a plurality of troughs, for example 32. As shown, when the rotary sensor wheel 17 is disposed within a trough 32, the reciprocal shaft 18 is disposed in a fully extended position. It should be noted that the sinusoidal pattern formed on the periphery 29 of the wheel 14 may be varied in frequency and amplitude, depending upon the rotational speed of the unloading apparatus.

Figure 3:
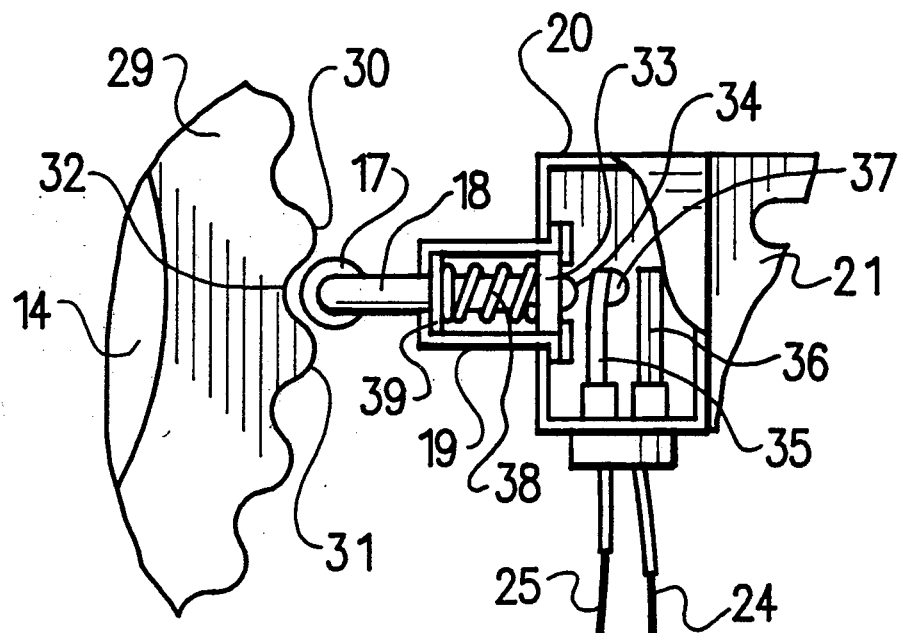
FIG. 3 is an additional detail view, partially cut away, illustrating the construction of the limit switch mechanism utilized in the rotary unloader monitor according to the present invention.

As shown in the cut away detail view of FIG. 3, the limit switch 20 includes a sleeve or cylinder 19 in which the shaft 18 is mounted for limited axial reciprocal movement. A coil spring 38 surrounds the shaft 18 within the cylinder 19, and has a first end in abutment with an end wall 33 of the cylinder 19. An opposite end of the spring 38 abuts a radial flange 39 formed on the shaft 18. An inner end portion 34 of the shaft 18 extends through an aperture provided in the end wall 33, and is movable into contact with a leaf spring member 35. The leaf spring member 35 has a hemispherical contact portion 37 which is movable into engagement with a rigid contact element 36. The contact element 34 and 36 are operative to complete a circuit between the electric leads 24 and 25. When the limit switch sensor wheel 17 is disposed within a trough 32, the spring contact 35 is disposed out of engagement with the rigid contact 36.

Figure 4:
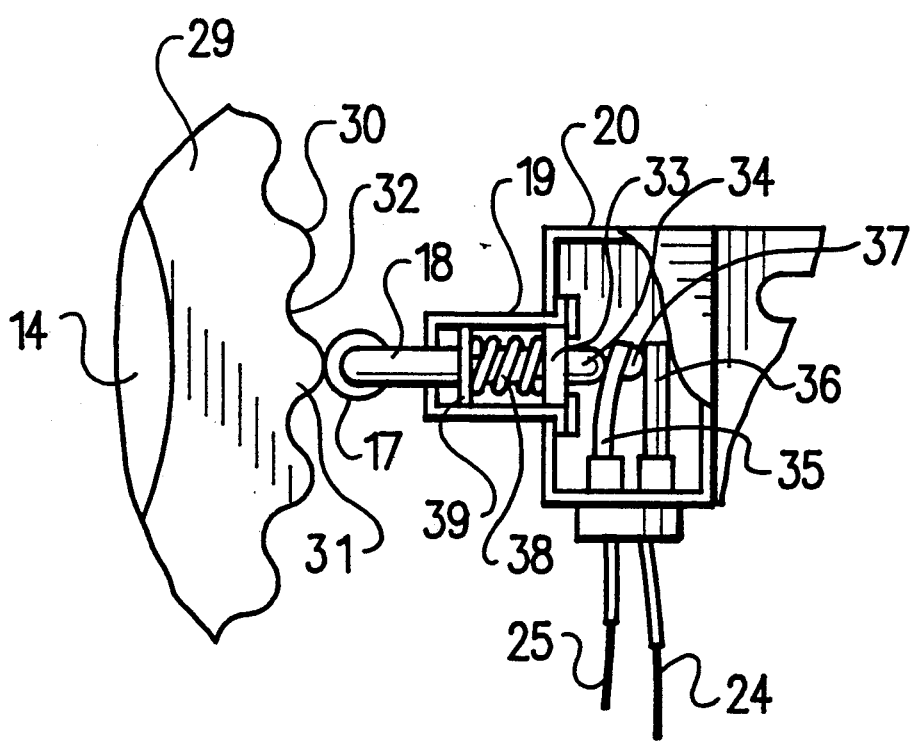
FIG. 4 further illustrates the manner of operation of the rotary unloader limit switch.

As shown in FIG. 4, when the sensor wheel 17 is disposed in engagement with a crest 31, the inner end portion 34 of the shaft 18 abuts the leaf spring contact 35, forcing the hemispherical contact portion 37 into contacting engagement with the rigid contact member 36, thus completing the circuit between the leads 24 and 25. As may now be understood, the leaf spring contact member 35 will cause a connection between the leaves 24 and 25, each time the sensor wheel 17 comes into contact with a crest of the peripheral sinusoidal wave pattern on the wheel 14. Thus, the frequency of the electrical pulses within the lead 25 is dependent upon the rotational speed of the wheel 14 and to the rotary collector ring of the unloader to which it is secured.

Figure 5:
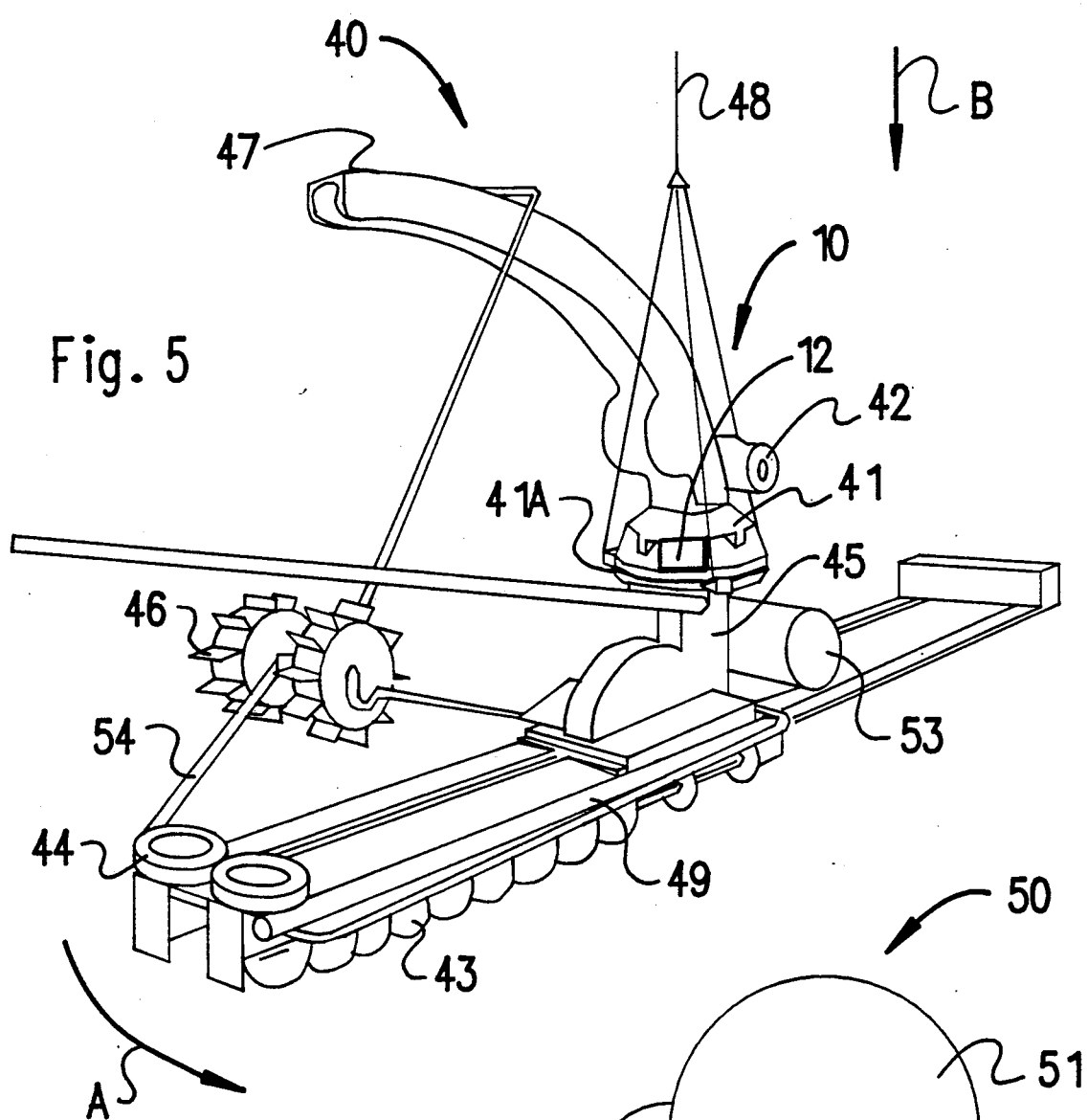
FIG. 5 is a perspective view illustrating the monitor of the present invention installed on a conventional silo rotary unloader.

FIG. 5 is a perspective detail view illustrating a conventional rotary unloader 40 of the type sold by VAN-DALE corporation of Wayzata, Minn. This type of rotary unloader includes a discharge chute 47, a stationary collector ring 41 secured to the discharge chute 47, a suspension cable harness 48 secured to the stationary collector ring 41, a rotary collector ring 41A rotationally secured to the stationary collector ring 41, a frame 49 secured to the rotary collector ring 41A, a screw auger 43 on the frame 49 and a drive motor 43 operative to rotate the screw auger 43 through a gear drive 45. The motor 53 is also operative to rotate drive wheels 44 and 46 through a belt drive 54. Thus, rotation of the drive wheels 46 in engagement with the grain stored within a silo, and engagement of the wheels 44 with the interior side wall surface causes rotation of the entire frame 49 and rotary collector ring 41A as indicated by arrow A. The chute 47 and stationary collector ring 41 remain in a stationary position, and are supported by the cable harness 48. The housing 12 of the unloader monitor is secured to the stationary collector ring 41. The wheel 14 (FIG. 1) is secured for rotation with a rotational mounting shaft of the rotary collector ring 41A. Thus, the rotary monitor 10 is operative to indicate the actual rotational speed of the rotary collector ring 41A. This is an important feature, because occasionally the drive belt 54 and frequently the drive wheels 44 and 46 are prone to slippage due to wet and freezing conditions within the interior of a conventional silo. The discharge chute 47 also includes a boost impeller driven by a motor 42 to facilitate discharge of grain from large diameter silos.

Figure 6:
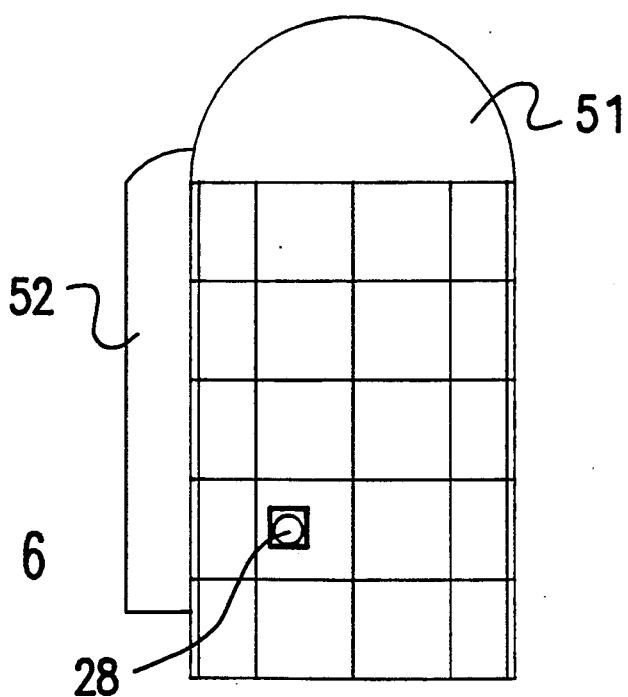
FIG. 6 is a side elevational view, illustrating the remote mounting of the indicating display of the rotary monitor of the present invention on an external side wall portion of a conventional silo.

FIG. 6 illustrates a side view of a conventional vertical silo 50. The rotary unloader 40, illustrated in FIG. 5, is suspended within the top portion 51 of the silo 50. The discharge chute 47 is maintained in alignment with an external chute 52 formed on the silo 50. The electric indicating lamp 28 is preferably mounted on an exterior side wall portion of the silo 50, to allow observation by an operator at ground level. Conventionally, the ground level operator controls and electric winch connected to the cable harness 48 illustrated in FIG. 5. The flashing of the lamp 28 will indicate the actual rotational speed of the unloader within the silo 50, allowing the operator to discharge grain through the external chute 52 in a more efficient manner.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters patent of the United States is as follows:

1. In combination with a silo rotary unloader having a discharge chute, a stationary collector ring secured to said discharge chute, a suspension harness secured to said stationary collector ring, a rotary collector ring rotationally secured to said stationary collector ring, a frame secured to said rotary collector ring, a screw auger on said frame, drive means for rotating said screw auger and for rotating said rotary collector ring with respect to said stationary collector ring, a rotary monitor, comprising:

a wheel mounted for rotation with said rotary collector ring, said wheel having a cylindrical side wall provided with a sinusoidal wave pattern;

a limit switch mounted on said stationary collector ring, said limit switch having an actuating sensor biased into engagement with said sinusoidal wheel side wall; and indicating means operably connected to said limit switch to indicate rotary speed of said wheel with respect to said stationary collector ring.

2. The silo rotary unloader monitor of claim 1, wherein said indicating means comprises an electric lamp which flashes at a rate proportional with a rotary speed of said wheel.

* * * * *